United States Patent [19]

Schwibinger

[11] Patent Number: 5,460,356

[45] Date of Patent: Oct. 24, 1995

[54] METHOD OF MANUFACTURING A TORSIONAL VIBRATION DAMPER

[75] Inventor: Peter Schwibinger, Ann Arbor, Mich.

[73] Assignee: Firma Carl Freudenberg, Weinheim, Germany

[21] Appl. No.: 135,610

[22] Filed: Oct. 12, 1993

[30] Foreign Application Priority Data

Oct. 17, 1992 [DE] Germany .................. 42 35 074.3

[51] Int. Cl.⁶ ................ B23P 13/00; F16F 7/04
[52] U.S. Cl. ................ 267/281; 29/447; 29/459
[58] Field of Search ............. 188/379; 267/276, 267/279, 281; 29/235, 447, 459; 148/287

[56] References Cited

U.S. PATENT DOCUMENTS

| | | | |
|---|---|---|---|
| Re. 29,823 | 11/1978 | Sievers et al. ............. | 267/281 X |
| 1,610,927 | 12/1926 | Butler ...................... | 51/319 |
| 2,329,653 | 9/1943 | Rogoff ..................... | 29/459 |
| 2,795,036 | 6/1957 | Haushalter ............... | 29/235 X |
| 3,073,016 | 1/1963 | Drake ...................... | 29/235 |
| 3,369,286 | 2/1968 | Marshall .................. | 29/235 |
| 4,895,668 | 1/1990 | Singh et al. ............... | 252/34 |

FOREIGN PATENT DOCUMENTS 758899  10/1956  United Kingdom ............ 29/447

Primary Examiner—Robert J. Oberleitner
Assistant Examiner—Kevin D. Rutherford
Attorney, Agent, or Firm—Kenyon & Kenyon

[57] ABSTRACT

The invention teaches a method of manufacturing a torsional vibration damper in which a metal hub ring and a metal inertia ring surrounding the hub ring are radially spaced apart by a gap. A spring body of rubber-elastic material is fired into the gap with the aid of a lubricant, the spring body and/or the surfaces of hub and/or inertia ring facing the gap being wetted with a lubricant composed of a water-salt solution prior to insertion of the spring body.

21 Claims, 2 Drawing Sheets

METHOD OF MANUFACTURING A TORSIONAL VIBRATION DAMPER

FIELD OF THE INVENTION

The invention relates generally to torsional vibration dampers, and more specifically to manufacturing torsional vibration dampers in which a hub ring and an inertia ring are separated by a spring body.

BACKGROUND OF THE INVENTION

Methods for making such torsional vibration dampers by simply bonding such parts together are already known. These methods are often used when quick and economical manufacture is required. It is important to note however that the magnitude of the transmissible torque is limited by the moment of force of the adhesive bond between the parts used. Often the magnitude of the transmissible torque is too low for many applications, so that other methods, such as the postbonding method, are used to make torsional vibration dampers.

In the postbonding method, an adhesive is applied to the hub and inertia rings before the rubber is injected. After the spring element is fired in, the torsional vibration damper is heated in a furnace for several hours to temperatures of about 175°. Torsional vibration dampers produced in this fashion exhibit good operating properties, but the manufacturing process is time-consuming and less than satisfactory from an economic standpoint.

SUMMARY AND ADVANTAGES OF THE INVENTION

An object of the invention is to teach a torsional vibration damper which can transmit high torque without vulcanizing the spring bodies to adjoining rings.

Another object is to provide a method of manufacture of torsional vibration dampers which is economically advantageous and may be performed in a short time.

A further object it to allow for transmissible torque that is on the order of that provided by vulcanized torsional vibration dampers.

The invention therefore provides a method of manufacturing a torsional vibration damper in which an inertia ring surrounds a hub ring and is radially spaced apart from the hub ring by a gap, the inertia ring having an inner surface facing the gap and the hub ring having an outer surface facing the gap, the method comprising the steps of: (1) placing an oxidation-enhancing lubricant on at least part of said surfaces facing the gap; and (2) inserting a spring body into the gap. Instead of or in addition to the step of placing the lubricant on the surfaces facing the gap, it is also contemplated that a step of placing an oxidation-enhancing lubricant on at least part of a spring body be used.

The invention therefore also provides a torsional vibration damper comprising a hub ring having an outer surface; a spring body surrounding at least part of the hub ring outer surface; an inertia ring having an inner surface, the inner surface surrounding at least part of the spring body; a hub ring oxidation layer on at least part of the hub ring outer surface; and an inertia ring oxidation layer on at least part of the inertia ring inner surface.

To achieve a high transmissible torque and a high adhesion between the spring body made of elastomer material and the adjoining metal surfaces of the inertia ring and hub ring, it is provided that the spring body and/or the surfaces facing the radial gap of the hub and/or inertia rings be wetted with a lubricant composed of a water-salt solution prior to the firing in of the spring body. The lubricant is used simultaneously as a firing fluid. The hub and inertia rings are of a metallic material that corrodes on its surface areas when exposed to the water-salt solution. Corrosion begins a short time after the metal surfaces are wetted, causing the surface roughnesses of the inertia ring and hub ring to increase. The higher surface roughness produces a significantly greater coefficient of adhesion, so that the transmissible torque of the torsion vibration damper, with spring bodies fired in, can transmit a torque equal to the transmissible torque of vulcanized torsional vibration dampers. Depending on the choice of metallic material for the hub ring and the inertia ring and on the salt content of the water-salt solution, corrosion formation can be controlled, so that the desired adhesive bond develops inside the torsional vibration damper.

The water-salt solution preferably has a salt content of 5 to 10%. This ensures that even a short time after the torsional vibration damper has been manufactured, sufficiently high adhesive friction exists within the torsional vibration as a result of the surface roughness of the rings adjacent to the spring body, without the concentration of the water-salt solution having to be so high that there is a danger of the metal rings being damaged.

The hub ring and/or inertia ring can be provided with a friction-increasing surface profile on the surface areas facing the gap before wetting with the water-salt solution. Such a surface profile can be created for example by blasting the surface with sand or glass beads, by embossing, or by turning. In addition to the physical engagement of the surface areas with the spring body, the relatively increased surface area after such roughening advantageously provides for better adhesion of the water-salt solution, which then also is not in danger of being completely removed from the gap while the spring body is inserted.

The water-salt solution is advantageously applied as a spray mist to the surfaces of the spring body and/or the rings to be wetted. It is advantageous in this connection for the parts to be coated with a uniform film of the solution and for the concentration to be approximately the same in all the surface areas. Uniform corrosion over the entire surface of the metal rings of the areas facing the spring body is thus ensured.

To achieve a further improvement in the adhesive bond, taking into account the materials of which the hub ring, inertia ring, and spring body are made, it is advantageous for the hub ring, prior to wetting with lubricant, to be cooled relative to the temperature of the inertia ring to a temperature above the freezing point of the water-salt solution. It is also then advantageous for the hub ring, after the spring body has been fired in, to be gradually reheated to room temperature, resulting in expansion in the radial direction. In addition to the surface roughened by corrosion, which may also be given a profile, increased radial pretensioning of the spring body is produced as well. The moment of force of the adhesive bond is thereby further increased, so that the transmissible torque is increased as well.

In addition to or alternatively thereto, it is possible to heat the inertia ring before wetting with lubricant relative to the temperature of the hub ring to a temperature that is below the evaporation point of the water-salt solution. In a method with this step, however, it is important to note that a suitable elastomer material whose creep tendency, even when exposed to higher temperatures, does not exceed an acceptable amount for the manufacturing process should be used. When the inertia ring cools after assembly to room temperature, the diameter decreases and the radial pretensioning on the spring body increases.

Torsional vibration dampers manufactured by the method according to the invention exhibit good operating properties and allow high transmissible torque by a good adhesive bond. They also can be manufactured economically. By avoiding a time-intensive vulcanization process, large quantities can be manufactured within a comparatively short time.

BRIEF DESCRIPTION OF THE INVENTION

In the attached figures, an embodiment of a torsional vibration damper is shown which can be manufactured by the method according to the invention.

DETAILED DESCRIPTION OF THE INVENTION

Figure 1:
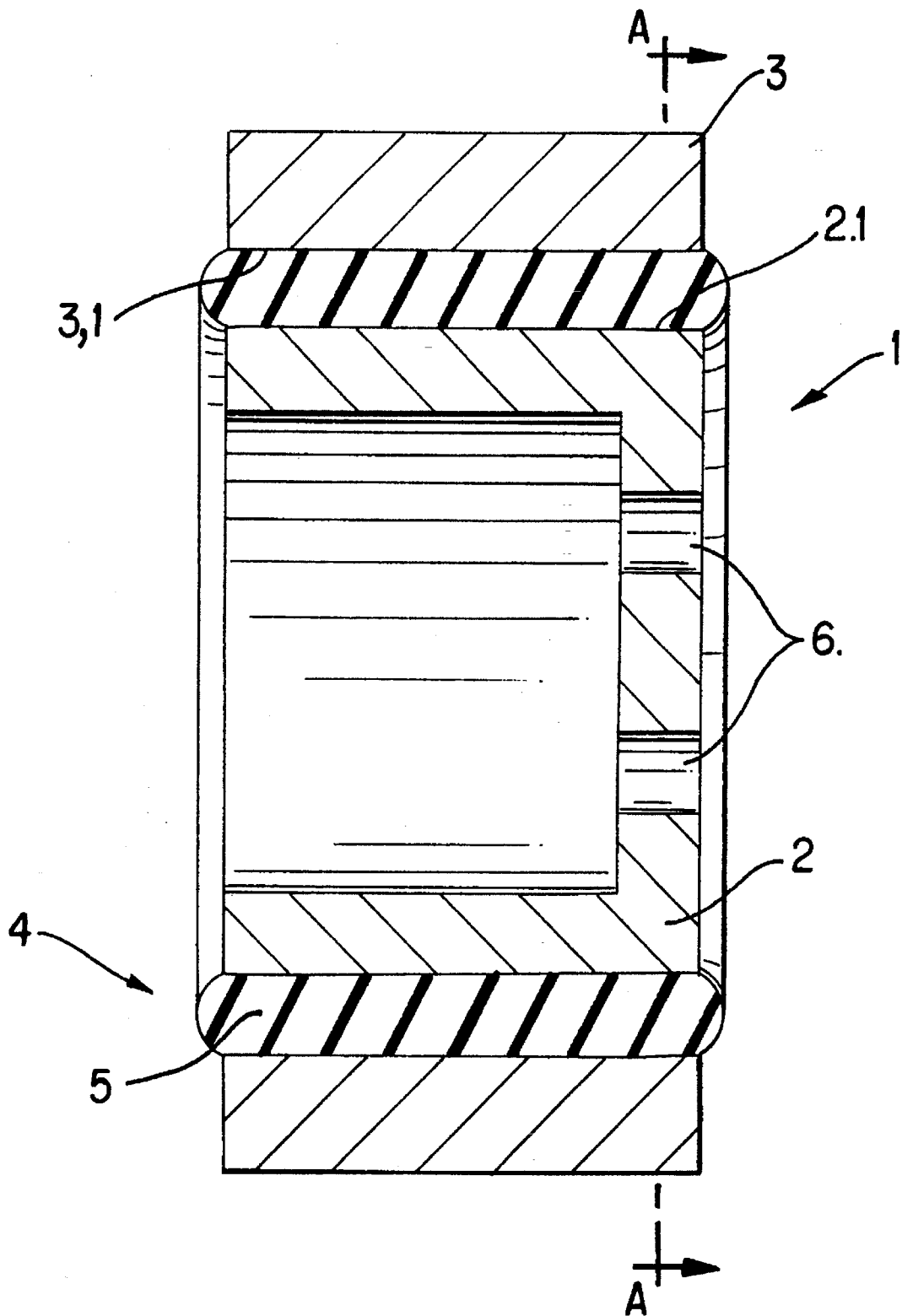
FIG. 1 shows the torsional vibration damper in cross section.
Figure 2:
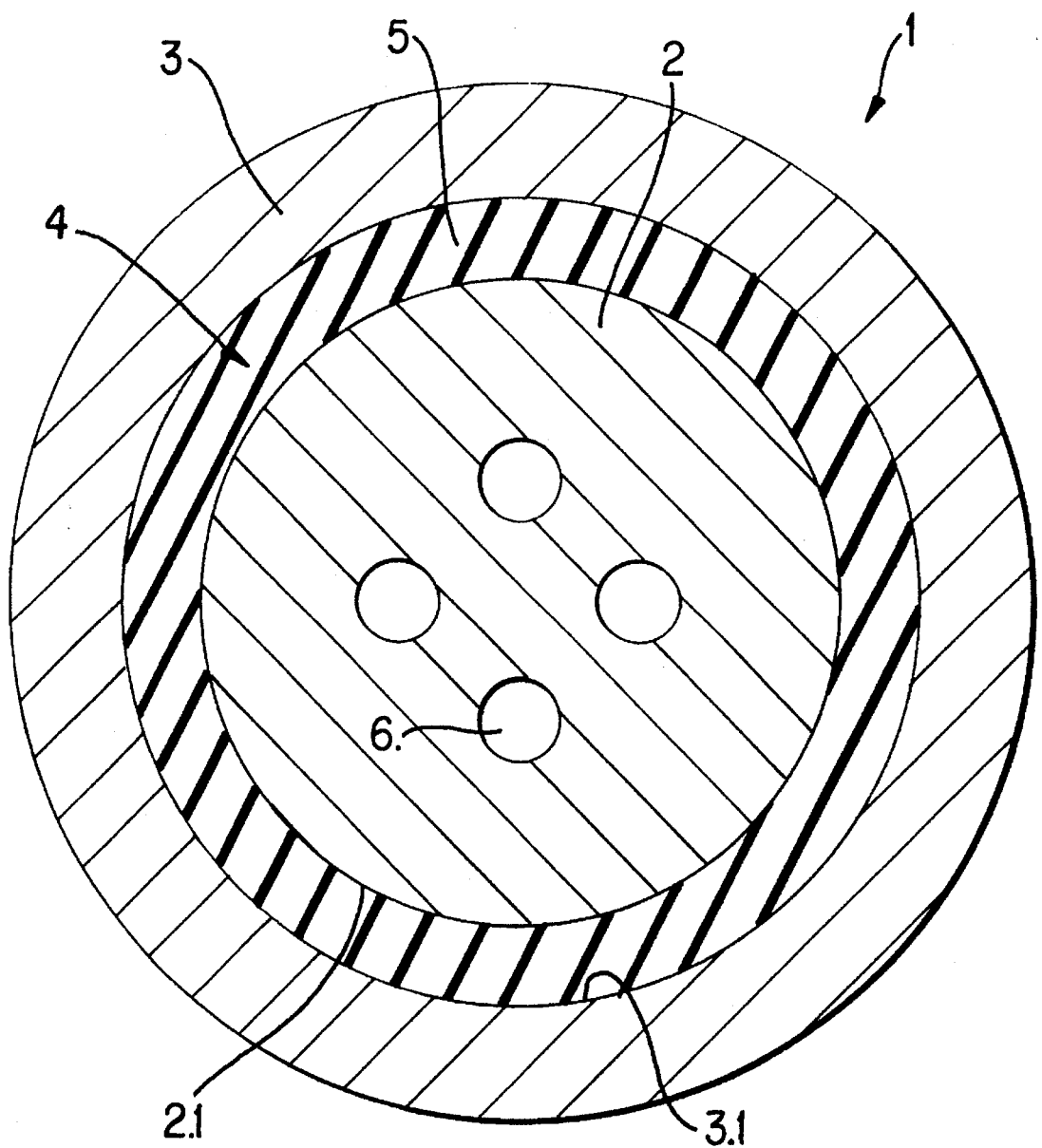
FIG. 2 shows the torsional vibration damper in FIG. 1 sectioned along line A—A.

FIGS. 1 and 2 show a torsional vibration damper 1 having a hub ring 2 and an inertia ring 3 surrounding hub ring 2 with a radial spacing. Hub ring 2 and inertia ring 3 are made of a metallic material. Spring body 5, located inside gap 4, is made of an elastomer material and is fired into gap 4 with the aid of a lubricant composed of a water-salt solution. Provision is made in the present invention for at least surface areas 2.1, 3.1 of the hub ring and inertia ring facing spring body 5 to be wetted with the water-salt solution before spring body 5 is fired in. Surface areas 2.1 and 3.1 can be given a surface profile to increase the transmissible torque. The spring body is located under radial pretensioning inside gap 4 between hub ring 2 and inertia ring 3, and is positively held therein by friction. In this embodiment, hub ring 2 is made pot-shaped and provided with holes 6 for mounting. Inertia ring 3 and/or hub ring 2 can be made in the form of a pulley and used to drive an auxiliary assembly in an internal combustion engine.

The method according to the invention can be used in many cases to make vibration dampers specially designed for each individual application, and to manufacture them economically in large quantities.

While the invention has been described according to the above-described preferred embodiment, it is contemplated that other embodiments may fall within the scope of the present invention, in particular that oxidation-enhancing lubricants other than salt water may be used, and also that the inertia ring can function as an input and the hub ring as an output, or visa versa.

What is claimed is:

1. A method of manufacturing a torsional vibration damper in which an inertia ring surrounds a hub ring and is radially spaced apart from the hub ring by a gap, the inertia ring having an inner surface facing the gap and the hub ring having an outer surface facing the gap, the method comprising the steps of:
controllably corroding at least part of said surfaces facing the gap by placing an oxidation-enhancing lubricant on said at least part of said surfaces facing the gap; and
inserting a spring body into the gap.

2. The method as recited in claim 1 wherein the oxidation-enhancing lubricant is a water-salt solution.

3. The method as recited in claim 2 wherein the water-salt solution has a salt content of 5 to 10%.

4. The method as recited in claim 2 wherein the corrosion is controlled based on at least a salt content of the water-salt solution and a material property of the hub ring and inertia ring.

5. The method as recited in claim 1 wherein at least one of the hub ring and the inertia ring is made of metal.

6. The method as recited in claim 1 further comprising the step of roughening at least part of said surfaces facing the gap prior to inserting the spring body.

7. The method as recited in claim 1 wherein the oxidation-enhancing lubricant is applied as a spray mist.

8. The method as recited in claim 1 further comprising the step of cooling the hub ring prior to inserting the spring body.

9. The method as recited in claim 1 further comprising the step of heating the inertia ring prior to inserting the spring body.

10. The method as recited in claim 1 wherein the spring body is made of an elastic material.

11. The method as recited in claim 1 wherein the spring body is inserted with the aid of a firing fluid, and the firing fluid is composed of the same substance as the oxidation-enhancing lubricant.

12. A method of manufacturing a torsional vibration damper in which an inertia ring surrounds a hub ring and is radially spaced apart from the hub ring by a gap, the inertia ring having an inner surface facing the gap and the hub ring having an outer surface facing the gap, the method comprising the steps of:
placing an oxidation-enhancing lubricant on at least part of a spring body to controllably corrode at least part of the inertia ring inner surface and the hub ring outer surface; and
inserting the spring body into the gap.

13. The method as recited in claim 12 wherein the oxidation-enhancing lubricant is a water-salt solution.

14. The method as recited in claim 13 wherein the water-salt solution has a salt content of 5 to 10%.

15. The method as recited in claim 13 wherein the corrosion is controlled based on at least a salt content of the water-salt solution and a material property of the hub ring and inertia ring.

16. The method as recited in claim 12 wherein at least one of the hub ring and the inertia ring is made of metal.

17. The method as recited in claim 12 further comprising the step of roughening at least part of said surfaces facing the gap prior to inserting the spring body.

18. The method as recited in claim 12 wherein the oxidation-enhancing lubricant is applied as a spray mist.

19. The method as recited in claim 12 further comprising the step of cooling the hub ring prior to inserting the spring body.

20. The method as recited in claim 12 further comprising the step of heating the inertia ring prior to inserting the spring body.

21. The method as recited in claim 12 wherein the spring body is inserted with the aid of a firing fluid, and the firing fluid is composed of the same substance as the oxidation-enhancing lubricant.

* * * * *